April 21, 1964 T. RAMÉN 3,129,756
TUBE ELEMENTS
Filed Nov. 12, 1959 5 Sheets-Sheet 1

INVENTOR
TORSTEN RAMÉN

BY *Stevens Davis Miller & Mosher*

ATTORNEYS

April 21, 1964  T. RAMÉN  3,129,756
TUBE ELEMENTS
Filed Nov. 12, 1959  5 Sheets-Sheet 3

INVENTOR
TORSTEN RAMÉN

April 21, 1964     T. RAMÉN     3,129,756
TUBE ELEMENTS
Filed Nov. 12, 1959     5 Sheets-Sheet 4

INVENTOR
TORSTEN RAMÉN

BY *Stevens, Davis, Miller & Mosher*
ATTORNEYS

April 21, 1964 — T. RAMÉN — 3,129,756
TUBE ELEMENTS

Filed Nov. 12, 1959 — 5 Sheets-Sheet 5

INVENTOR
TORSTEN RAMÉN

BY Stevens, Davis, Miller & Mosher
ATTORNEYS

United States Patent Office 3,129,756
Patented Apr. 21, 1964

3,129,756
TUBE ELEMENTS
Torsten Ramén, Drottninggatan 71C, Stockholm, Sweden
Filed Nov. 12, 1959, Ser. No. 852,382
Claims priority, application Sweden June 30, 1959
2 Claims. (Cl. 165—157)

The present invention relates to a tube element adapted to be used in heat exchangers and similar apparatus, such as steam generators, economizers and the like to accommodate a stream of fluid medium which undergoes heat exchange with a second fluid medium which is present around the tube element.

The main object of this invention is to provide a tube element of this type which is simple and inexpensive to manufacture and assemble and which withstands the pressures to which it may be subjected during the operation of the apparatus.

The tube element according to this invention comprises two opposing elongate plate members each having along its longitudinal edges and optionally also along one or more intermediate lines parallel to said longitudinal edges longitudinal flat portions which are opposed to and welded to corresponding flat portions of the other plate member, the plate members between said longitudinal flat portions being shaped so as to form together one or more longitudinal passages of substantially uniform cross-sectional area along the length of the tube element. The transverse spacing of the longitudinal flat portions and the thickness of the plate members are such that the element is capable of withstanding the internal or external pressure to which the elements are subjected during operation of the heat exchanger or similar apparatus in which the tube element is to be used. For a lower plate thickness a smaller spacing between the flat portions will be selected, while for a greater thickness a greater spacing may be employed.

As above mentioned, the tube element according to this invention may be employed in all types of devices where a heat exchange is to take place between two fluids one of which is passed through one or more tube elements according to this invention, while the other fluid is passed around it. For example, the tube element may be used as a water tube in a boiler. In the following description, the tube element will be described more in detail in connection with a heat exchange of the type comprising a plurality of parallel sheet-like members forming passages for one fluid while the other fluid flows between and outside the sheet-like members. Various types of such heat exchangers are known and disclosed e.g. in the U.S. Patent No. 2,526,157.

Such heat exchangers have hitherto generally been constructed with a casing of rectangular shape which surrounds the sheet-like members. For reasons of strength it would be more advantageous to utilize a cylindrical casing, but this has the disadvantage that the widths of the sheet-like members would vary in different parts of the casing which would complicate the manufacture.

However, the tube element according to this invention may advantageously be used to construct such a heat exchanger with a cylindrical casing, in that each sheet-like member which in cross-section extends along a chord of the cylindrical casing is composed of a plurality of tube elements according to this invention, the widths of which are selected so that together they are essentially equal to the length of said chord. It is possible to manufacture a few types of tube elements according to this invention of different widths and by selecting various combinations of them to obtain a great number of various widths of the sheet-like members.

The invention will be described more in detail below with reference to the embodiments thereof shown by way of example on the accompanying drawings, wherein.

Figure 1:
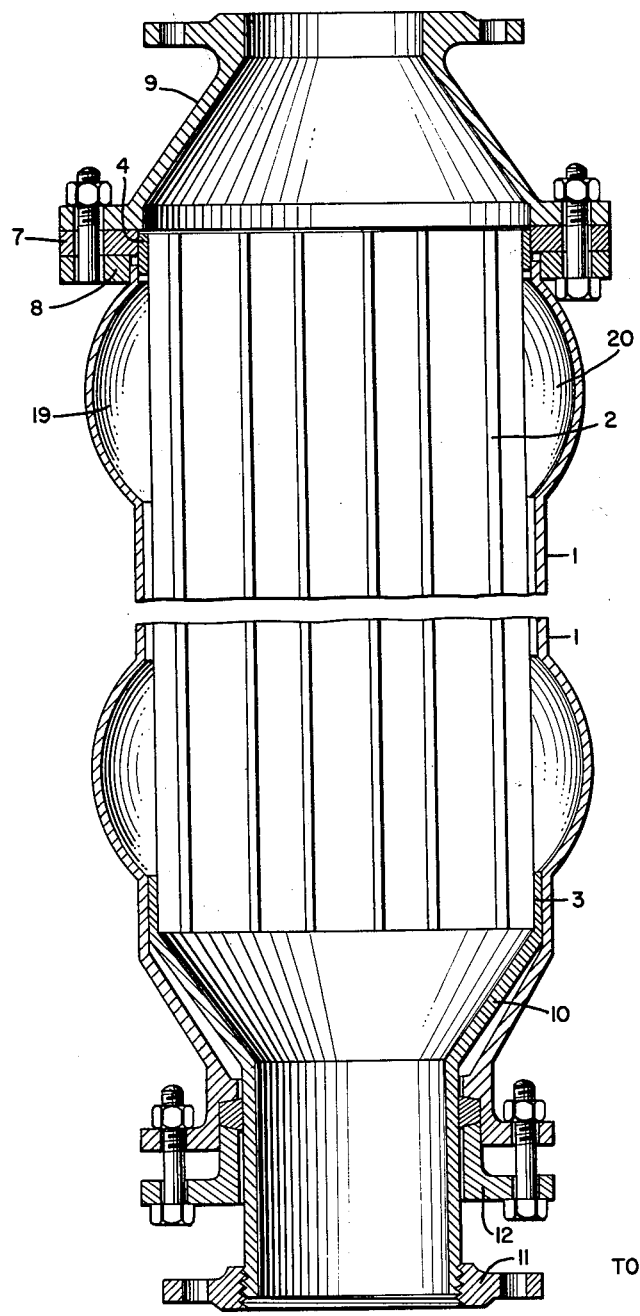
FIGURES 1 and 2 show two longitudinal sections, taken at right angles to each other, of a heat exchanger comprising tube elements according to this invention.
Figure 2:
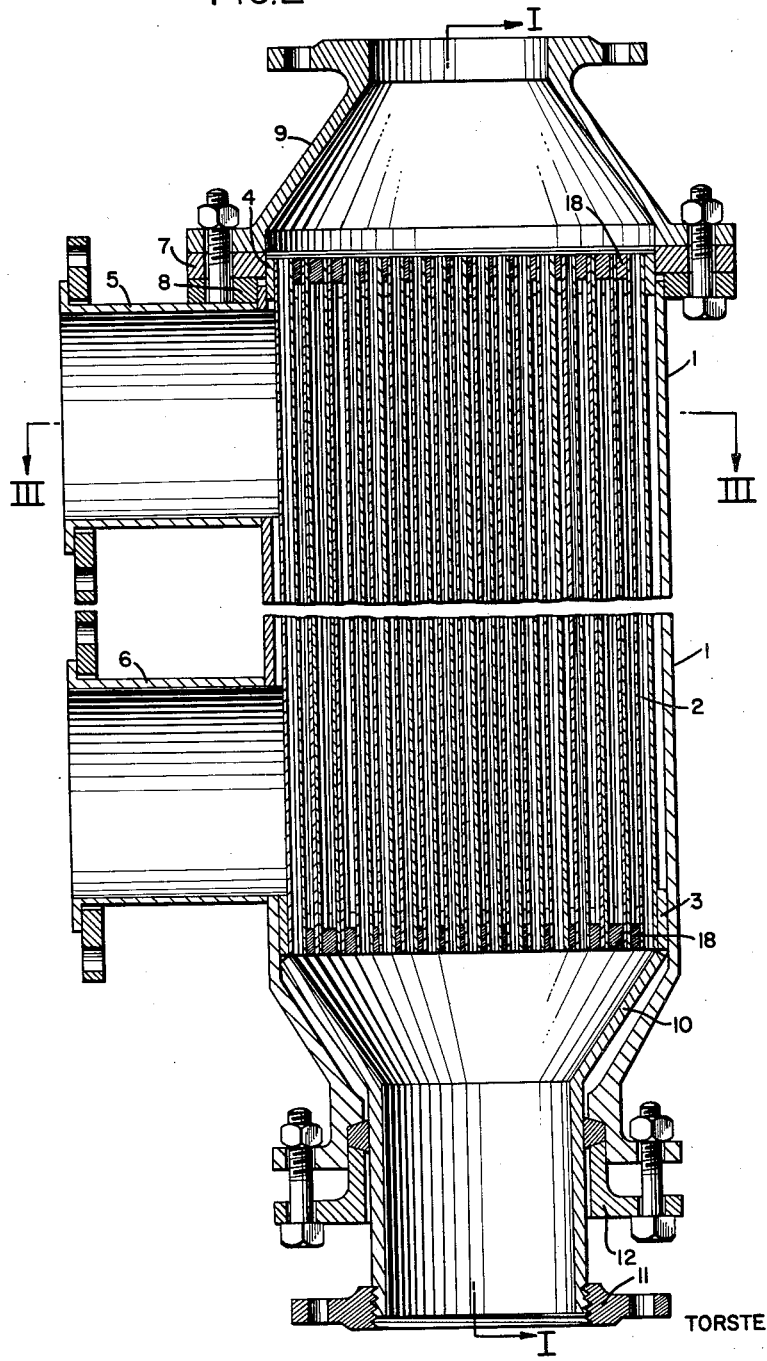

Referring to the drawings, the heat exchanger shown therein comprises a cylindrical elongate casing 1, in which are positioned a plurality of sheet-like members 2 forming passages for one fluid, e.g. steam, while the other fluid flows between or outside these members.

The members 2 are supported at their ends by two frames 3, 4. Adjacent its ends the casing 1 is formed with inlet and outlet pipes 5 and 6 for the fluid flowing between the sheet-like members. Welded to the frame 4 is a flange 7 which is disposed between a flange 8 of the casing 1 and a connecting member 9 through which the fluid flowing within the sheet-like members enters or leaves. The second frame 3 is welded to a connecting member 10 to the opposite end of which a flange 11 is screwed for connection to a conduit. The casing end surrounds said connecting member 10 and forms together with the displaceable gland 12 a stuffing-box which seals around the connecting member.

All the sheet-like members 2 form together with the frames 3 and 4 and the members secured thereto a unit which after removal of the flange 11 and the connecting member 9 may easily be taken out from the casing for inspection and cleaning.

Figure 6:
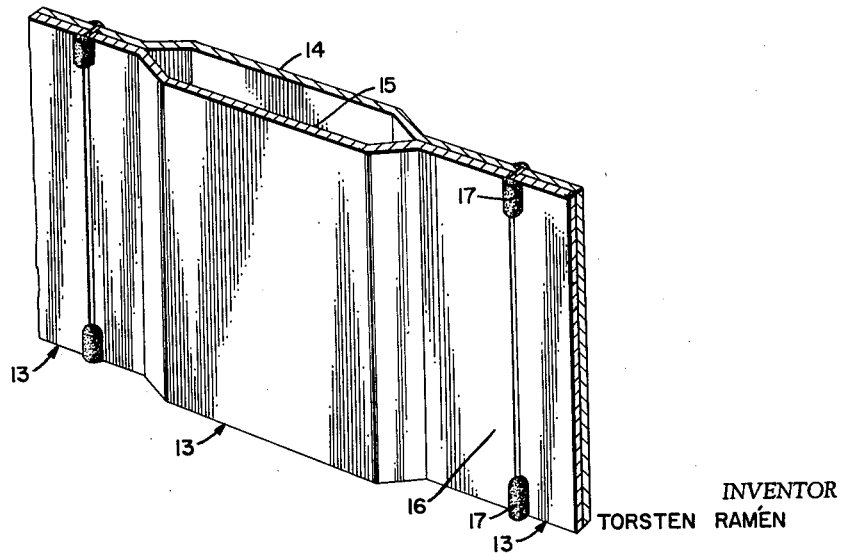
FIGURE 6 is a perspective view, on an enlarged scale, of a portion of a tube element.

Each sheet-like member 2 is composed of one or more tube elements 13 the construction of which is seen most clearly from FIGURE 6. The tube element 13 comprises two elongate plates 14 and 15 of equal lengths and widths. Along their longitudinal edges both plates have depressions 16 the depth of which corresponds to half the thickness of the flow passage defined by the plates 14 and 15. These opposed depressions are welded together e.g. by electric resistance seam welding, so that the two plates are joined to form a unit.

The tube elements 13 may be manufactured in a simple manner by providing the plates 14, 15 with the depressions 16 in a roller mill, whereupon the two plates are welded together in a seam welding machine of usual construction. If desired, the plates may simultaneously with the depressions along the longitudinal edges be provided with one or more depressions parallel to the longitudinal edges, which are thereupon welded together in the two plates, so that the element comprises two or more longitudinal passages.

Figure 3:
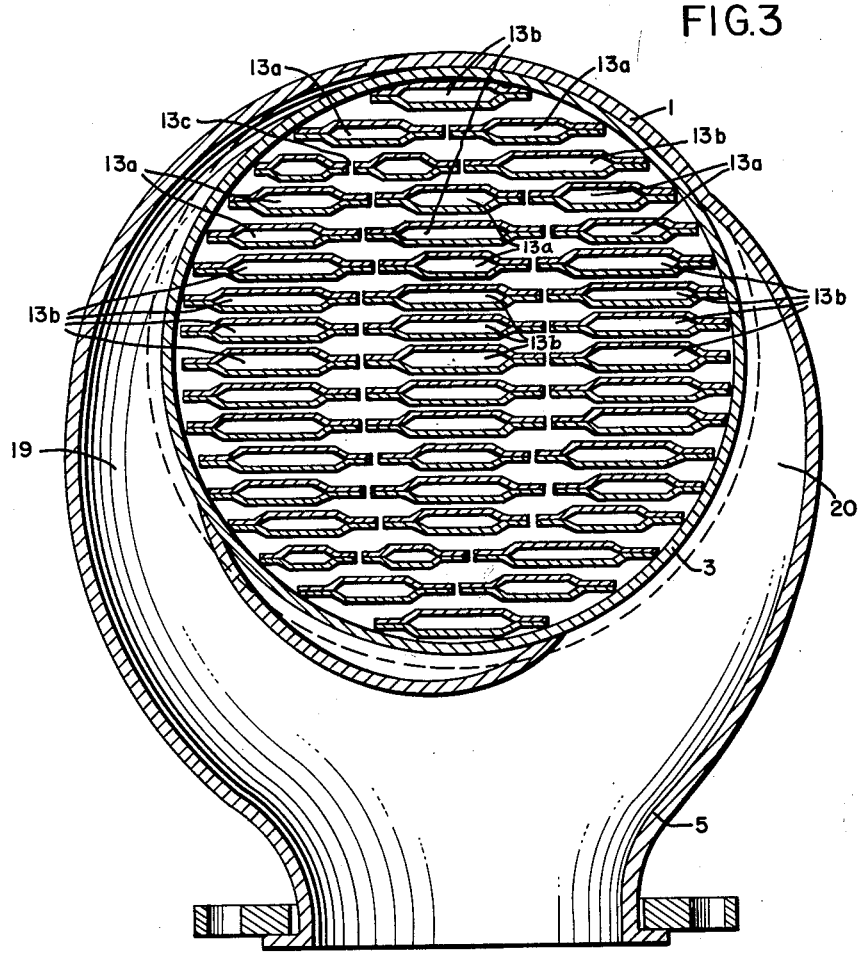
FIGURE 3 shows a transverse section of the heat exchanger according to FIGURES 1 and 2.
Figure 5:
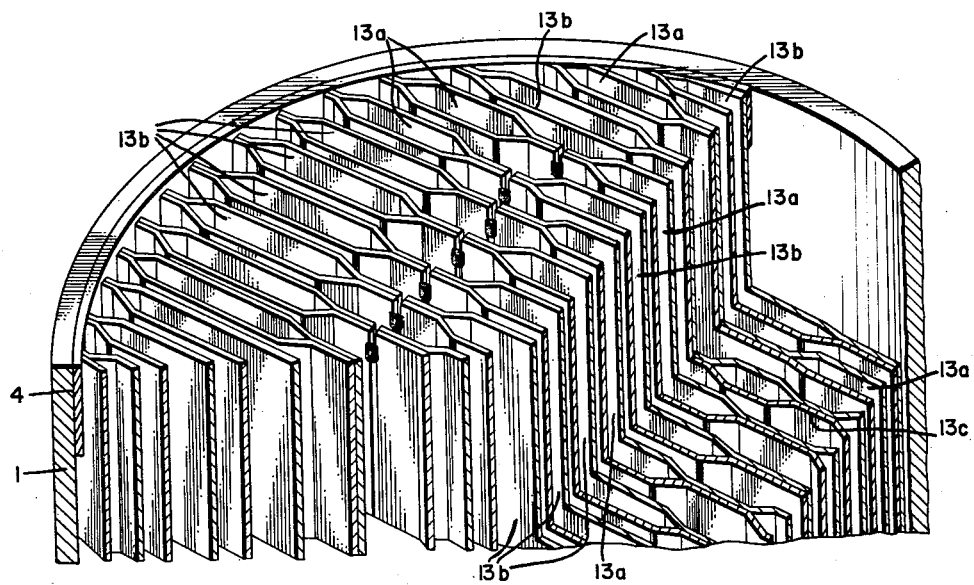
FIGURE 5 is a perspective view, partly in section, of the top portion of the heat exchanger.

As seen most clearly from FIGURES 3 and 5, each sheet-like member 2 comprises one or more tube elements 13 placed alongside each other. In order that each sheet-like member shall extend substantially across the casing 1, so that its cross-section is utilized as completely as possible, each sheet-like member 2 is composed of tube elements such that their total width is substantially equal to the length of the chord in the circular cross-section along which the sheet-like member extends. This is possible with the aid of a few types of tube elements of different widths. In the example illustrated, three different types of tube elements are employed, namely tube elements 13a and 13b of the type shown in FIGURE 6, the tube elements 13b, however, being wider than the tube elements 13a, and also tube elements 13c comprising two parallel longitudinal passages and having a width somewhat greater than that of tube elements 13b. By way of example, the tube elements 13a may have a width of 50 mm., the tube elements 13b a width of 60 mm. and the combined tube elements 13c a width of 70 mm. As seen in FIGURE 3, the outermost member 2 comprises a single tube element 13b while the next member 2 consists of two tube elements 13a. The third member 2 consists of one element 13b and two elements 13c, the fourth sheet-like member consists of three elements 13a, and the fifth member consists of one element 13b and two elements 13a. The sixth member is composed of two elements 13b and one element 13a, while the seventh and eighth as well as the central sheet-like member which extends along a diameter consist each of three elements 13b. In the other half of the casing the arrangements of the sheet-like members is similar to that described. Of course, the widths of the tube elements and the number of different types of them as well as their combinations may vary considerably. However, as the example illustrates, it is possible by means of only a few types of tube elements of different widths to construct sheet-like members of very varying widths so that a cylindrical casing can be filled as completely as possible.

The adjacent tube elements in each sheet-like member 2 may suitably be joined to each other by point welding along the adjacent edges, as seen at 17 in FIGURE 6.

Figure 4:
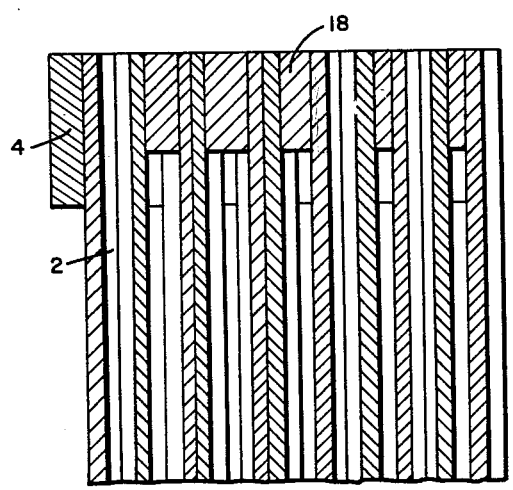
FIGURE 4 shows a section on an enlarged scale of the top portion of the elements of the heat exchanger.

The channels between the sheet-like members 2 are closed towards the ends of the casing 1, so that the fluid introduced through the member 9 or 10 cannot enter the intermediate channels but is forced to flow within the passages of the members 2. As seen from FIGURE 4, filling members 18 are inserted in the ends of the intermediate channels and are welded to the members 2. Similar filling members are arranged at the lower ends of the sheet-like members.

The fluid which is to flow between or outside the members 2 must enter the channels between the members 2 in a lateral direction from the pipe 5 (or 6) and must in the same manner flow laterally to leave through the pipe 6 (or 5). To this end these two pipes are constructed as shown for the pipe 5 in FIGURE 3. The axis of the pipe 5 extends normally to the plane of the members 2 and the pipe communicates with two passages 19, 20 which extend each partly around the package of sheet-like members 2 on opposite sides thereof, so that the fluid entering through the pipe can enter the channels between the sheet-like members from both sides. However, the disposal of passages 19 and 20 is unsymmetrical insofar as the passage 19 communicates with a member of central channels at both sides of the medial plane of the device and also with those outer channels which are farthest away from the pipe 5 but not with those outer channels which are closest to the pipe 5, while the passage 20 communicates with the outer channels closest to the pipe 5 and also with the central channels, but not with those outer channels which are farthest away from the pipe 5. The reason therefor is that the central channels which are wider should be filled from both sides, while the outer more narrow channels should be filled only from one side, to achieve a uniform distribution of the fluid.

The pipe 6 is arranged in the same manner as the pipe 5 and need not be described in detail.

In the embodiment described above, the contacting surfaces of the two plates are situated in the central plane of the tube element, i.e. the depressions are of equal depths in the two plates so that the tube element is symmetrical. In another embodiment of the invention, the contacting surfaces of the two plates are offset from the central plane of the tube element. This has the advantage that the edge flanges formed by the joined depressions on two adjacent elements may be placed one above the other whereby the total width of a number of tube elements placed alongside each other is reduced as compared to the first embodiment.

Figure 7:
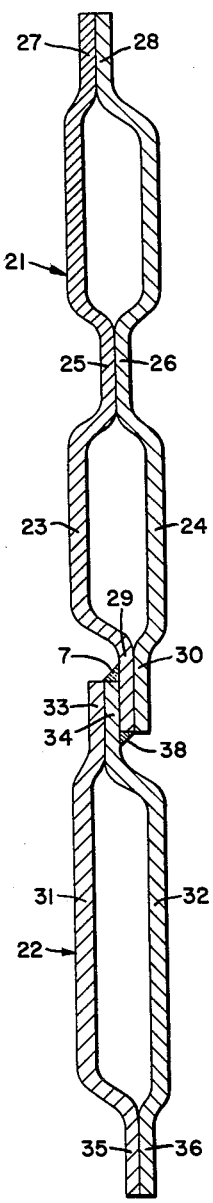
FIGURES 7 and 8 are cross-sections of two modified forms of tube elements.

FIGURE 7 shows two tube elements according to this embodiment. One of them, 21, is formed with two longitudinal passages which are formed thereby that the plates 23, 24 of the tube element has depressions 25, 26 along a middle line thereof and also depressions 27, 28, 29, 30 along its edges. The other tube element 22 has only one longitudinal passage so that its plates 31, 32 are only formed with depressions 33, 34, 35, 36 along its edges. The opposed depressions are joined to each other by welding, as described above.

In the tube element 21, the two opposed intermediate depressions 25, 26 are of equal depth, i.e. their contacting surfaces are in the middle plane of the tube element 21. The depressions along the edges of the tube elements are of different depths, namely so that one depression 27 of the plate 23 is less deep than the depression 25 and its other depression 29 is deeper than the depression 25, while in the plate 24 the depression 28 which is opposed to the depression 27 of the plate 24 is deeper and the depression 30 is less deep than the depression 26. Thus, the contacting surfaces are offset in opposite directions from the middle plane of the element. The depth of the depressions is suitably such that the external surfaces of the depressions 28 and 29 are in the middle plane of the tube element.

In the tube element 22, the depressions 33, 34, 35, 36 are arranged relatively to each other in the same manner as the depressions 27, 28, 29, 30 in the tube element 21, so that the contacting surfaces are offset in opposite directions from the middle plane of the element with the external surfaces of the deeper depressions 34, 35 lying in the middle plane of the element.

As illustrated in FIGURE 7 these tube elements are disposed alongside each other with the corresponding depressions of the elements turned in the same directions, so that the flanges formed by the joined edge depressions are in overlapping relationship, as illustrated for the depressions 29, 30 and 33, 34. The elements can be joined by spot welding or continuous welding along the edges, as shown at 37 and 38. Thereby a tube element set is formed which has essentially flat sides, but has less width than in the case where the tube elements are placed with the lateral flanges in abutting relationship, which is necessary when the contacting surfaces of the edge depressions are in the middle plane of the element, as in the first embodiment described above.

Figure 8:
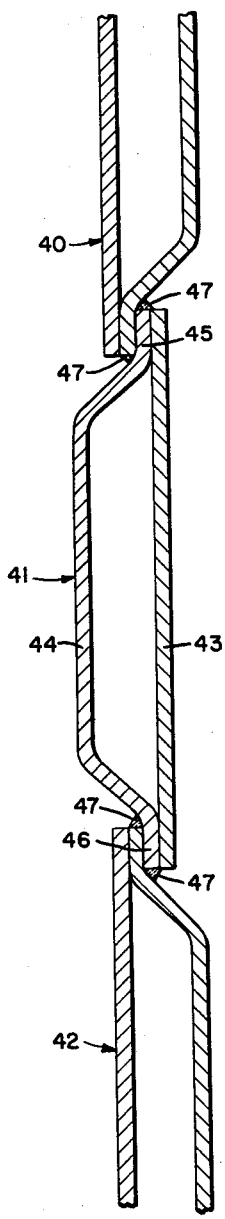

FIGURE 8 illustrates three tube elements 40, 41, 42 according to another embodiment. In this example the three tube elements are similar to each other and are adapted to form one passage each, although it will of course be possible to form them with two or more passages in the manner shown for the tube element 21 of FIGURE 7.

Each tube element comprises one flat plate 43 and a bent plate 44 formed with depressions 45, 46 of equal depth along its two longitudinal edges. These depressions are welded to the opposed marginal zones of the flat plate 43.

When these tube elements are employed to form a substantially flat tube element set for a heat exchanger or the like, the tube elements are disposed alongside each other and facing alternatingly in opposite directions, as shown in FIGURE 8, and with the depressions engaging each other. The elements are joined by welding in the same manner as in the previous embodiment, as seen at 47.

Many modifications and variations are possible within the scope of the invention. Thus for example, the plates need not be flat between the depressions 16, as shown in the drawing, but may be rounded or have any other desired cross-section.

I claim:

1. A heat exchanger comprising a cylindrical casing having at least two sets of inlets and outlets for two different fluids which are to undergo heat exchange in the heat exchanger, a set of flat, substantially rectangular hollow elements within said casing and in communication with one set of said inlets and outlets for the passage therethrough of one fluid, said elements being disposed in parallel relationship and parallel to the axis of said casing and spaced apart from each other and the other set of said inlets and outlets being in communication with the spacers about said elements with the other fluid being passed between and around said elements, each of said elements being composed of plates arranged in coplanar spaced relation and having longitudinal sides in sealing engagement with one another to define hollow tube elements therebetween, said hollow tube elements being arranged in parallel array diametrically across the casing, certain of said hollow tube elements having different transverse dimensions whereby each hollow element within said casing is made up of said tube elements in a manner so as to substantially fill the chordal extent of the casing in the curved cross section in the casing along which the elements extend, the longitudinal edges of adjoining tube elements being secured together at longitudinally spaced points to define slots therebetween for cross flow of said other fluid.

2. A heat exchanger as claimed in claim 1, wherein said longitudinal sides of adjoining tube elements define longitudinal recesses.

References Cited in the file of this patent

UNITED STATES PATENTS

| | | |
|---|---|---|
| 1,208,790 | Junkers | Dec. 19, 1916 |
| 2,526,157 | Ramen | Oct. 17, 1950 |
| 2,620,169 | Gross et al. | Dec. 2, 1952 |